US012018888B2

(12) United States Patent
Bloemendaal

(10) Patent No.: US 12,018,888 B2
(45) Date of Patent: Jun. 25, 2024

(54) GRAIN DRYING

(71) Applicant: Brent J. Bloemendaal, Zionsville, IL (US)

(72) Inventor: Brent J. Bloemendaal, Zionsville, IL (US)

(*) Notice: Subject to any disclaimer, the term of this patent is extended or adjusted under 35 U.S.C. 154(b) by 100 days.

(21) Appl. No.: 17/367,845

(22) Filed: Jul. 6, 2021

(65) Prior Publication Data

US 2022/0381510 A1 Dec. 1, 2022

Related U.S. Application Data

(60) Provisional application No. 63/193,869, filed on May 27, 2021.

(51) Int. Cl.
*F26B 21/06* (2006.01)

(52) U.S. Cl.
CPC .................................... *F26B 21/06* (2013.01)

(58) Field of Classification Search
CPC ...... F26B 21/06; F26B 2200/06; F26B 9/063; F26B 3/06
USPC ........................................................... 34/495
See application file for complete search history.

(56) References Cited

U.S. PATENT DOCUMENTS 4,126,946 A * 11/1978 Buffington ................ F26B 3/06 432/78
5,119,571 A * 6/1992 Beasley ................ F26B 21/086 34/446
5,570,521 A 11/1996 Baker et al.
6,122,838 A 9/2000 Bloemendaal
6,834,442 B1 12/2004 Bloemendaal
6,834,443 B2 12/2004 Bloemendaal
8,981,884 B2 3/2015 Mullen et al.
9,015,958 B2 4/2015 Bloemendaal
9,409,327 B2 8/2016 Bloemendaal
9,551,737 B2 1/2017 Bloemendaal et al.
9,683,955 B2 6/2017 Bloemendaal et al.
9,788,492 B2 10/2017 Bloemendaal et al.
9,835,375 B2 12/2017 Bloemendaal
9,889,583 B2 2/2018 Bloemendaal
2003/0033057 A1* 2/2003 Kallestad ............... G06Q 40/12 700/277
2012/0151790 A1* 6/2012 Savarese ................... F26B 3/30 34/236
2015/0354889 A1* 12/2015 Hunter ...................... F26B 3/02 34/212
2015/0354895 A1* 12/2015 Bloemendaal .......... F26B 9/063 34/507
2022/0178610 A1* 6/2022 James ................... F26B 25/007

* cited by examiner

*Primary Examiner* — John P Mccormack
(74) *Attorney, Agent, or Firm* — AVEK IP, LLC; John C. McMahon

(57) ABSTRACT

Drying of newly harvested grain wherein the grain has a preferred market moisture content target and the grain is heated and dried to within about four percent above the target and discharged at about 110° F. Thereafter, the grain is cooled to ambient by circulating ambient air at preferably one third of a cubic foot per minute per bushel through the grain thereby removing about two percent additional moisture. When required the grain is further dried to target moisture utilizing an equilibrium moisture process.

21 Claims, 3 Drawing Sheets

GRAIN DRYING

CROSS-REFERENCE TO RELATED APPLICATIONS

This application claims the benefit of provisional patent application Ser. No. 63/193,869, filed May 27, 2021, entitled GRAIN DRYING, the entirety of which is incorporated herein by reference. This application also claims the benefit of provisional application for patent entitled GRAIN AERATION BIN, Ser. No. 62/806,089, filed Feb. 15, 2019 and applicant's co-pending application entitled GRAIN AERATION BIN, Ser. No. 16/791,599, filed Feb. 14, 2020.

BACKGROUND OF THE INVENTION

A significant portion of the American economy is related to the production of various edible grains which can be grown for animal or human consumption. Most grain, when harvested, has a moisture content that is higher than desirable. It is higher therein desirable mostly because high moisture in the grain leads to degradation, rot, and mold formation during storage and/or shipping. While the grain market can and does accept grains having some moisture, which can vary for different grains, a moisture content above the market acceptance level results in a significant penalty when the farmer takes it to market. For example, corn and wheat normally have a market moisture content target of 15% by weight. However, if the moisture content goes below the target, the farmer loses money, not due to penalty, but rather because they are paid by weight and the weight is less. For example, if the moisture content is 14% then the farmer gets paid less than if the percentage were 15%, because the overall weight of the grain sold is about one percent less.

Because the moisture needs to be removed soon after harvest to stop the formation of mold and other problems, heat in the form of heated moving air is conventionally utilized to remove the excess moisture in a grain dryer. That is, as the air is heated, the percentage of moisture that the air can absorb increases and the heat vaporizes the moisture so it can then be absorbed in the air.

In one conventional grain drying process, grain is harvested in the field at a grain moisture content determined by various factors including the type of grain, the temperature of the ambient air for a period prior to harvest, the amount of rainfall prior to harvest and the like. Grain is virtually always harvested at a moisture content that is above that which will produce mold and other unwanted effects after harvest and that is above the preferred or target market moisture content, at which the farmer gets paid for the full weight of the grain without penalty for having too much moisture. After harvest, the grain is most often dried in what is called a full heat dryer which reduces the moisture content from harvest moisture (often 20% to 25%) to a selected moisture content, such at 17% moisture, (as used herein moisture percentage or % is by weight). The grain is discharged from the dryer above ambient temperature, for example at 140° F. and placed in a bin to cool to ambient temperature by means of ambient air being blown therethrough by a fan at a rate of for example 0.33 cubic feet of air per minute per bushel, which, when cooled to ambient, leaves the grain at, for example, 15% moisture. In this process, the residual heat in the grain drives moisture from the grain during heating which is then transferred into the air circulating through the grain and carried out of the grain and the bin holding the grain.

It is noted that when working with the drying of grain, the moisture percentage does not normally meet an exact percentage because of volume of material being worked and small variances throughout the grain being dried. Therefore, the percentages used herein are all "about", that is normally plus or minus 0.5% moisture content and often closer, but variances do occur. The grain at a selected moisture, such as 15% moisture, is stored until sold. If the ambient temperature outside the grain storage bin raises to 10° F. above the temperature in the grain being stored, the grain is warmed by heat being added to air circulating through the grain to prevent natural convention and moisture migration that would damage the grain.

In a second modified conventional drying process, the harvested grain is dried to 18% moisture and discharged at 125° F. from the dryer into a bin. In the bin, the grain is cooled with ambient air at 0.33 cubic feet of air per minute per bushel of grain to 16.5% moisture. Grain is stored with heated air being blown through the grain, if the ambient air temperature is more than 10° F. above the temperature of the grain. In Spring, temperature, humidity and other conditions allow ambient air to remove additional moisture and ambient air is circulated at appropriate conditions for 4 to 6 weeks to lower the moisture content to market moisture which would be 15% moisture for many grains. The grain is not over aerated, so that the air does not remove too much moisture and it does not get below market moisture content.

SUMMARY OF THE INVENTION

In an embodiment of the invention is a method of drying harvested grain comprising selecting a market grain moisture content for the grain; placing the harvested grain in a dryer and passing a full heated air stream through the grain in the dryer while releasing the air to the ambient atmosphere after the air passes through the grain until the moisture content of the grain is about four percent above market grain moisture content and the temperature of the grain is about 110° F.; thereafter placing the grain in a bin and passing ambient air through the grain in the bin at a rate of approximately one third of a cubic foot per minute per bushel until the moisture content of the grain is about two percent above market grain moisture content; thereafter maintaining the grain in the bin until ambient temperature and humidity are such as to utilize equilibrium moisture removal to occur and at that time utilizing equilibrium moisture to remove the moisture within the grain until the grain has the market grain moisture content; thereafter storing the grain at about market moisture content; and thereafter transferring the grain at market moisture content to market.

A further embodiment of the invention is a grain drying system providing a grain dryer adapted to receive and discharge grain therefrom; the dryer having an interior; providing a first conduit between atmospheric air and the dryer interior; providing a high speed on/off first fan positioned to draw air through the first conduit and into grain in the interior of the dryer; providing a conveyor mechanism or conveyor to convey grain from the dryer to a bin; the bin having an interior; providing a second conduit communicating with the interior of the bin; and providing a variable speed second fan positioned in the second conduit to draw ambient air from the atmosphere and discharge air into the interior of the bin and cooling the grain from the dryer utilizing the second fan at a low speed.

A still further embodiment of the invention is a method of drying grain that has a harvest moisture content and a target market moisture content including the steps of placing the grain in a dryer and applying full heat to the grain until the grain is within about four percent moisture above target market moisture content and has a temperature of about 110° F.; after step a transferring the grain from the dryer to a bin; and circulating cooling ambient air at a low velocity through the grain in the bin to reduce the temperature of the grain to ambient air temperature while removing moisture so that the moisture content is thereafter about two percent above the target market moisture content.

A still further embodiment of the invention is a method of drying harvested grain with a harvest moisture content comprising the steps of selecting a market moisture content for the grain; placing the grain in a dryer and circulating air heated by a full heat heater through the grain until a first intermediate grain moisture content that is above the market moisture content occurs; thereafter removing the grain from the dryer and placing the grain in a bin at a temperature above ambient air temperature; after the grain is placed in the bin circulating ambient air at a low flow rate through the grain until the grain is cooled to ambient air temperature and the grain has a second intermediate moisture content that is above market moisture content; thereafter holding the grain in the bin until ambient air temperature and humidity levels are such to be able to remove additional moisture from the grain and at that time circulating ambient air at the low flow rate through the grain until the grain moisture content is at market moisture content; and thereafter holding the grain in the bin until transferring to market.

A still further embodiment of the invention comprises a method of reducing the moisture contained in grain including the steps of: setting a final target moisture content for a quantity of grain to be dried; placing the grain to be dried into a dryer; passing heated air through the grain in the dryer and heating the grain with heated air flow until a preselected intermediate moisture is obtained in the grain and the grain has achieved a preselected intermediate temperature wherein the preselected intermediate temperature and preselected intermediate moisture content are determined based upon the amount of moisture still needed to be removed from the grain to achieve the selected final moisture content based on the energy remaining in kernels of the grain; transferring the grain at the preselected intermediate temperature to a cooling bin; blowing air through the grain while monitoring the temperature and humidity of the air exiting the grain; during the step of blowing air through the grain controlling the flow rate of the air through the grain by adjusting the speed of a fan mechanism that produces the flow of air such that as the humidity of the air exiting the grain decreases when the fan mechanism increases the flow of air as long as the air temperature of the air exiting the grain in the bin is above ambient air temperature and decreasing the air flow rate from the fan mechanism when the humidity approaches 100% in the air exiting the grain that is cooling in bin to thereby maximize moisture removal from the grain relative to the heat remaining in the grain.

A further embodiment of the invention comprises a method of cooling heated grain and reducing the moisture level of grain after the grain exits a full heat dryer at a temperature above ambient temperature and at a grain moisture content above a desired market grain moisture content, comprising the steps of: providing a cooling bin for receiving the heated grain; placing the heated grain in the cooling bin; providing a pathway for ambient air to enter the cooling bin pass through the heated grain and then exits the cooling bin; locating a humidity sensor and a temperature sensor in the pathway whereat the air that has passed through the heated grain exists the cooling bin; providing a variable air flow output fan system that draws ambient air and circulates the air through the pathway; and connecting the humidity and temperature sensors through a control system with the fan systems and utilizing the output of the temperature and humidity sensors to control the air flow output of the fan system by: increasing the air flow through the bin when the humidity sensor indicator indicates that the moisture level in the airflow is close to or at 100%; decreasing the air flow through the bin when the humidity sensor indicator that the moisture level in the air is substantially below 100%; and turning off the fan system completely to stop air flow if the temperature of the air when the humidity sensor is less than 100% and the temperature sensor indicates that the temperature in the existing air flow is ambient temperature.

A method of drying grain in a storage bin that has a target moisture content and an actual moisture content comprising the steps of: providing an atmospheric humidity sensor; providing a bin humidity sensor in the bin in proximity to an air flow exit from the bin; providing an atmospheric temperature sensor; providing a bin temperature sensor in proximity to an air flow exit from the bin; providing a fan system for controlling flow of atmosphere air into the bin; providing a controller and linking the atmospheric humidity sensor, the bin humidity sensor, the atmospheric temperature sensor, the bin temperature sensor and the fan system to the controller; and thereafter utilizing the controller to compare the atmospheric and bin humidity and the atmospheric and bin temperature to determine against selected preset data when atmospheric conditions enter a condition zone appropriate for atmospheric air to be able to withdraw moisture from the grain and initiating the fan system during such condition zone so as to transfer moisture in the grain into the air and thereafter out of the bin.

Other embodiments and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
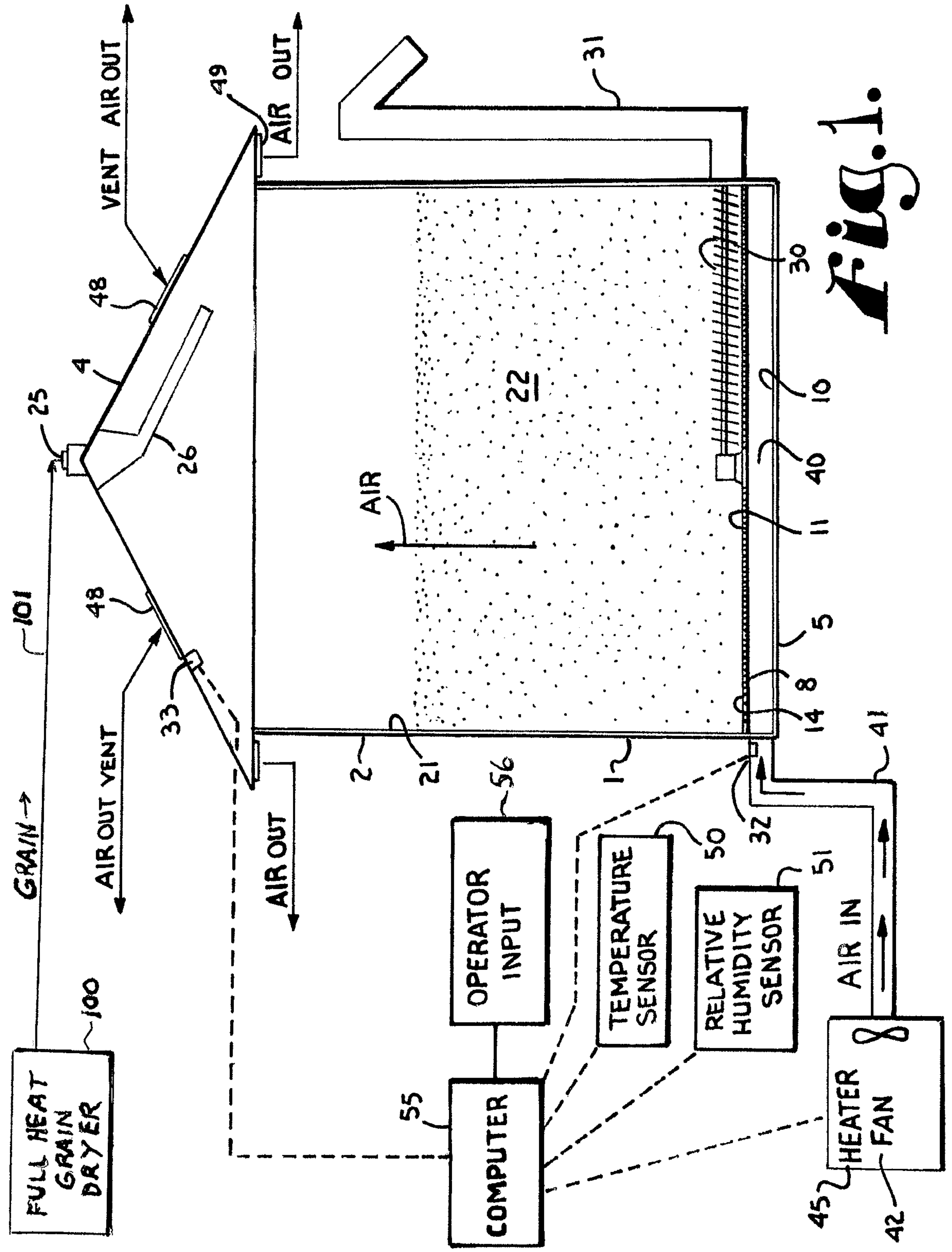
FIG. 1 is a partially diagrammatic representation of a grain drying process according to the present application.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Grain to be dried is harvested from the fields and initially placed in a relatively high temperature grain dryer 100 and conveyed to a grain colling bin 1. In the dryer 100 the grain is normally subjected to "full heat" dryers wherein the heat is normally applied at the maximum rate available to the grain. The dryer 100 may be of any suitable type of which many are known, including but not limited to counter flow and crossflow types. The grain is removed from the dryer 100 and transferred by conduit 101 to the top of the bin 1.

The bin 1 includes a cylindrical body 2, a roof 4, and a bottom 5 forming a generally enclosed area with an open interior. Located above the bottom 5 is a perforated floor 8 that operably allows upflow of air therethrough and forming an air flow chamber 10 between the bottom 5 and floor 11. The top of the floor 8 forms a grain support surface 14 for supporting grain 22. The interior of the cylindrical body 2 provides a smooth inward facing cylindrical wall 21. Incoming grain 22 from conduit 101 passes through receiver 25 in the roof 4 and is spread in the bin 1 by a distributer 26. A discharge chute or conduit 31 provides for discharge of the grain 22 from the bin 1 for further processing or transport to a purchaser of the grain 22.

A sensor 32 senses the temperature, humidity and flow rate of air 40 coming into the air flow chamber 10. At least one sensor 33 senses the humidity and temperature of the air near or at whereat the air flowing through the bin (air flow indicated by arrow) exits the bin 1. The sensor 33 may also be in the headspace or area located below the bin roof 4 and above the grain 22 in the bin 1. The sensor 33 can be located at one or more exits of the air into the ambient atmosphere or along the roof 4 where the air flows.

Ambient air is driven by fan 42 through a conduit 41 into the air flow chamber 10. The fan 42 may be a variety of different fans that would each or as a group allow control of the air flow thorough conduit 41 in accordance with the invention. Such fans would include a single variable speed fan, a single speed fan with an on/off capability, or various combinations thereof wherein a controller 55 (that may be a human operator or a computer or the like) can vary the air flow as required by the process.

Figure 3:
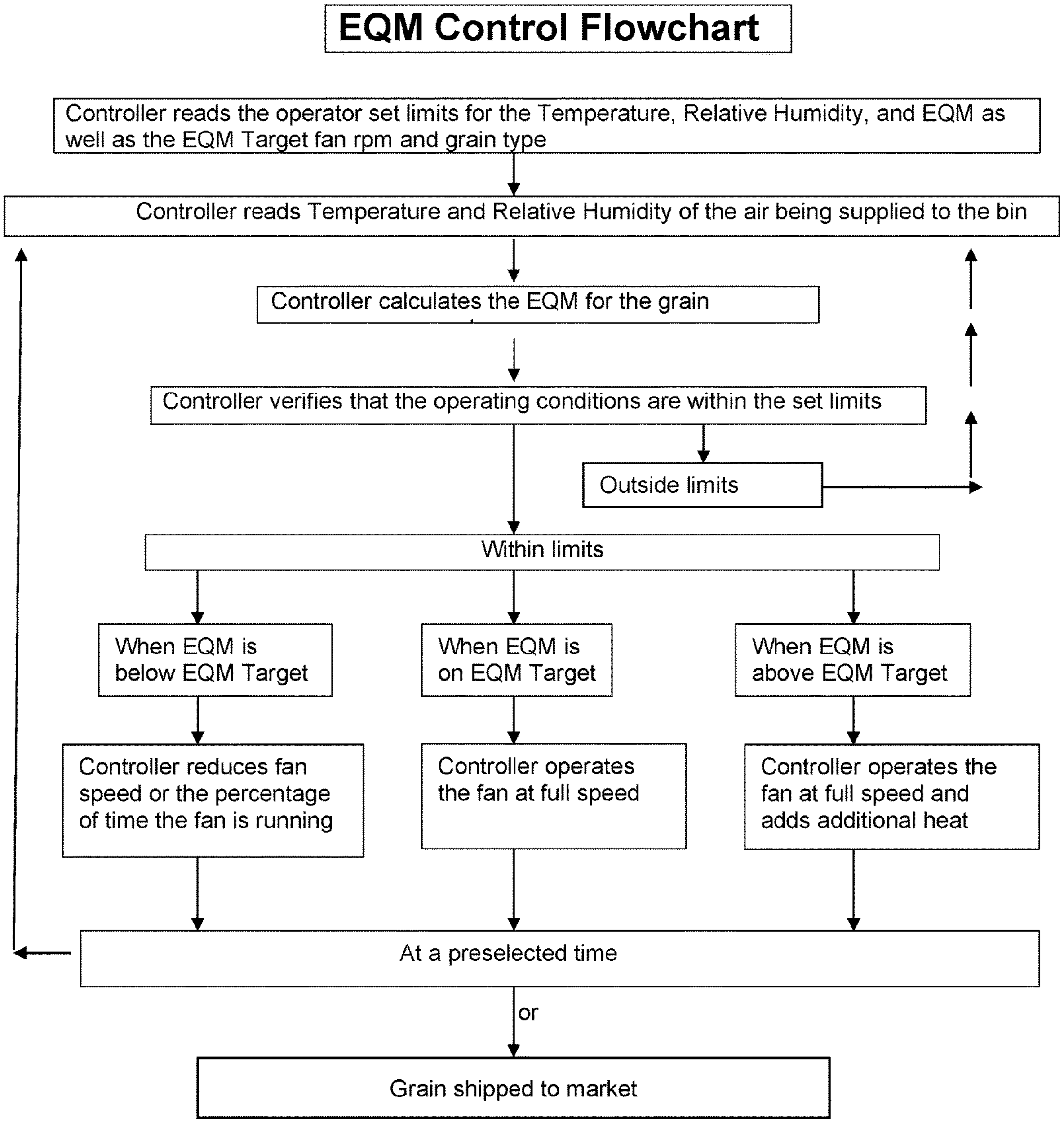
FIG. 3 is a flowchart utilizing EQM control to reduce moisture content and maintain moisture content at a selected level in a bin.

A heater 45 is provided for air entering through conduit 41. The heater 45 is not normally needed during the initial cooling process in the bin 1, but may be especially beneficial for equilibrium drying processes, as illustrated in FIG. 3 that occur at later stages of the drying process. The heater 45 is controlled independently of the fan 42. That is, when the fan 42 is operated, the heater 45 may or may not be operated at the same time.

Air that passes through the grain 22 exits the bin 1 though a plurality of vents 48 on top of the roof 4 and vents 49 located where the roof 4 overhangs the bin 1 or the like. The sensor 33 is preferably located by one of the vents 48, but can be at other locations whereat such a sensor sense the temperature and humidity of the air exiting the bin 1 or in the headspace above the grain 22 and below the roof 4.

The control mechanism 55 is provided to control the operations of the cooling dryer bin 1. In the illustrated embodiment the control mechanism 55 is a computer; however, it is foreseen that the control mechanism 55 may be a manually operated through the control mechanism 55 by providing operator input 56 through a keyboard or the like. A flowchart incorporating the control mechanism 55 for a particular embodiment of the invention is shown in FIG. 2.

The control mechanism 55 receives information from various sensors. In particular, the control mechanism 55 receives outdoor (or ambient) air temperature through a temperature sensor 50 and outdoor (or ambient) humidity through humidity sensor 51. Further the control mechanism 55 receives bin humidity from air exit bin humidity sensor 33 which also includes a temperature sensor that senses and provides the temperature of the air exiting the bin 1.

In response to the inputs of the prior paragraph, the control mechanism 55 controls the flow of ambient air into the bin 1 by coupling with the fan 42 and heater 45. In order to provide control over airflow through the bin 1, it is important for certain embodiments of the present application to be able to vary the air flow. Consequently, the fan 42 may be a variable speed fan, or a fan that can be turned on and off, or the like offering variable air flow, or a mixture of such fans and in some cases such a mixture with a fan that is continuously on at a fixed speed in combination with variable air flow fans whereby air flow can be operationally controlled.

Figure 2:
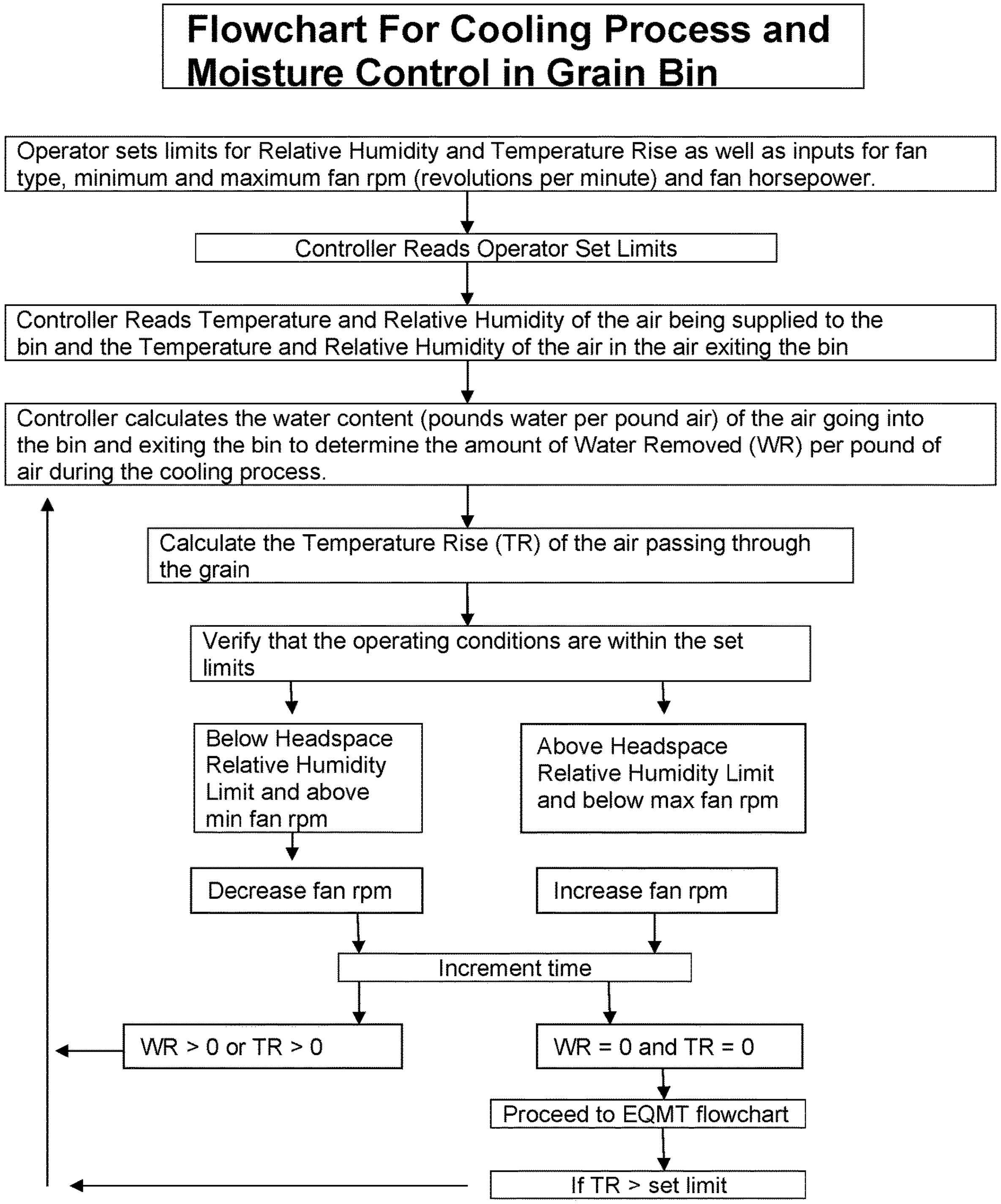
FIG. 2 is a flowchart for cooling and moisture control of grain in a cooling bin in accordance with an embodiment of an invention of the application.

The control mechanism 55 preferably compares the humidity output of sensors 32 and 33 as well as utilizes the temperature sensors in sensors 32 and 33 to adjust the flow of air through the bin 1 in accordance with various operational methods of the application including cooling methods of the type illustrated in FIG. 2 and the EQM methods of the type illustrated in FIG. 3.

Normally the overall system is used first to cool grain 22 utilizing heat contained in the kernels of the grain after full heat drying to a selected moisture content, and then the EQM methods are utilized to provide any further drying that is needed and thereafter maintain the moisture content of the rain, both process in the same bin 1.

A method of drying grain in accordance with the present invention includes the steps of harvesting a grain crop, determining or choosing a market grain moisture target, placing the grain in high temperature (or full heat) dryers until the grain moisture is at about a first intermediate grain moisture target of four percent moisture content above the market grain moisture target and then removing the grain from the dryer at a temperature target of about 110° F., thereafter placing the grain in a cooling bin with cooling ambient air flowing through the grain of between 0.1 and 1.5 cubic feet per minute and preferably approximately one third cubic foot per minute of air per bushel of grain until the cooling grain moisture grain content is at a second moisture content target of preferably approximately two percent moisture content above market target moisture content and the grain temperature is about that of ambient air. Actual moisture content normally varies in a range of about plus or minus 0.5% depending on various factors. The cooled grain is then held in storage until ambient weather conditions allow use of equilibrium moisture procedures to remove the final about two percent of grain moisture content at which time such equilibrium moisture procedures are used to lower the grain moisture content to about the market target moisture content. It is always preferred to use any residual heat contained in the grain kernels as opposed to adding further heat or utilizing warm and low moisture (low humid) air to dry the grain.

More specifically, the harvested grain may be any grain crop wherein the moisture content of the grain at harvest is above the target moisture content for the grain. Such grains include corn, wheat, soybeans, rice and many other human or animal edible grains or grain used for other purposes. Many of those grains have a harvest moisture content somewhere in the 20% to 25% range depending upon many conditions, including the type of grain, the moisture content of the ground where it is grown, rainfall, temperature, humidity, and the like. For each type of grain, the eventual market for the grain sets a market moisture content whereat full price of the grain is paid for each pound or bushel sold. The market moisture content is normally set by grain buyers to provide a uniformity in the content of the grain and to reduce degradation of the grain while in storage. Most commonly, the market moisture content for many grains in the United States, such as corn, is 15% moisture by weight (as used herein, all moisture contents are by weight rather than by volume). For some grains the market moisture content may be less, such as wheat often at 13.5% or rice and soy at 13% or 13.5%. If a seller has grain that is above the target moisture content, then they are penalized with respect to a lower selling price. If the grain is less than the market moisture content, then there is no penalty in price received; however, the grain weighs less and the seller is paid on the basis of weight, so they receive less than they would if the grain were at the market target moisture content.

The dryer used for the process may be any conventional grain dryer using various types of flow of the grain through the dryer including the illustrated bin 1. In this case the dryer is also a cooler of the grain 22 exiting the full heat dryer 100. Such dryers operate on the basis of full heat wherein the maximum possible air flow and heat are applied to the grain by the system when on or the heat and fan are entirely off. That is, the dryer 100 is either full on with respect to fan and heater or full off. Thus, as used herein, the term full heat means that the dryer operates at about the full output of both air fan and heater, as the dryer normally has a lot of grain to be handled and dried therein in a short time, because more grain is quickly coming from the harvest. Furthermore, such dryers 100 normally have only one setting for drying wherein the air flow and heat output are at maximum.

In many prior art processes, the grain is dried in the dryer until the moisture content therein is about 2% above the market moisture content and then discharged while still quite hot (at or above 140° F.) and the residual heat in the grain is utilized to drive an additional 2% of the grain moisture out of the grain to achieve market moisture content. This is a very harsh process on the grain and causes shock that produces damage to grain kernels and reduces the overall quality of the grain. The heat input to raise the temperature of the grain is expensive and adds significantly to the drying cost of the grain.

In an embodiment of the present application, the grain is heated in the full heat process until sufficient moisture is removed that a first intermediate moisture content target of the moisture more than about 4% moisture content above market moisture content is removed. The first intermediate moisture content target can vary somewhat for different grains, but would normally be within one half of one percent moisture content of the first intermediate target moisture content and thus, as used herein, the term about with respect to moisture content means plus or minus one half of one percentage point of moisture.

At or about when the moisture content is at the first intermediate target of 4% above market moisture content, the grain is removed from the full heat dryer 100 and placed in the holding bin 1 for cooling and further moisture removal. The grain temperature at the time it is placed in the cooling bin 1 depends on the moisture content of the harvested grain. When the harvested grain has a lot of moisture, then the grain is heated longer and is at a higher temperature such as 150° F. or higher. Low moisture grain is heated less and exits the dryer at a lower temperature, such as 90° F. or lower. Preferably, the grain moisture is such that it exits the dryer at about 110° F. and is about 40° F. to 60° F. above normal ambient air temperature. With respect to temperature, the term "about" means plus or minus 10° F. with respect to 110° F., as it will vary due to ambient conditions, type of grain, etc. The grain going into the bin 1 thus has residual heat and the residual heat is sufficient to evaporate moisture through the shell and from the grain kernel and drive off an additional amount of moisture from the grain 22, as ambient air at about a third of a cubic foot per minute per bushel is passed upwardly through the grain so as to further dry and also cool in the bin 1 until the temperature of the grain 22 becomes at or near the ambient air temperature. The volume of the air used for cooling in this way is considered a low flow rate and requires a variable speed fan that normally has a much higher flow rate capacity, but that can be set for 0.5 cubic feet per minute per bushel or, preferably, at 0.33 cubic feet per minute. A preferred air flow rate for some embodiments is 0.1 cubic feet per minute; however, flow rates at or between 0.1 and 0.5 cubic feet per minute work well for most embodiments of the application. When the grain is at ambient temperature it will be at a second intermediate moisture content target of about 2% moisture content above market target moisture content.

The grain, after cooling in the bin 1, is then at ambient temperature and about 2% moisture content above market moisture content. The grain is thereafter stored in the bin 1 until ambient weather conditions allow equilibrium moisture processes to be utilized to lower the moisture content an additional 2% moisture content. Equilibrium moisture processes are described in detail in applicant's provisional application for patent entitled GRAIN AERATION BIN, Ser. No. 62/806,089, filed Feb. 15, 2019 and applicant's co-pending application entitled GRAIN AERATION BIN, Ser. No. 16/791,599, filed Feb. 14, 2020 is incorporated herein by reference.

In summary, such equilibrium moisture processes are best utilized when the ambient weather conditions are such that the air temperature (preferably higher) and humidity (preferably lower) are such that when ambient air is circulated through the grain the air will withdraw more moisture from the grain. In order to enhance the equilibrium moisture process, a small amount of heat may be added to the air by a variable output heater to raise the temperature of the air enough to pull out additional moisture as compared to what can be done with just the air without heat. The equilibrium moisture process is utilized along with natural drying of ambient air until the grain is at the desired market target moisture content or the process is used to maintain a desired market moisture content while the grain 22 is stored. The grain is treated during storage as other stored grain.

Normally, the best time to operate the equilibrium moisture process is in the Spring and Fall for that short period wherein the temperature and humidity of the air are such that circulation of air through the grain has the capacity to remove additional moisture for at least a few hours a day. As noted, additional heat can be added to increase the ability of the air to remove moisture from a few hours to approximately two to three times as many hours a day for a longer window of time thereby significantly reducing the time required for drying. The added heat need only be sufficient to raise the temperature of the air 5 to 10° F. for most processing. Removal of the remaining 2% moisture may take 5 to 6 weeks using this process and does not create the stress in the grain that equivalent removal of moisture under full heat would cause.

Example I

A farmer harvests 15,000 bushels of corn and puts it in a 30-foot diameter bin that is 35 foot tall. The grain is delivered in trucks at a rate of 1,000 bushels per truck per hour starting at 8 AM and ending at 11 PM. A dryer operating at full heat capacity is provided and 1,000 bushels of grain are fed to it per hour. The grain is fed through the dryer and has a residence time of about one hour beginning at 9 AM and finishing at midnight. The temperature of the grain entering the dryer is between 40° F. and 60° F. with a relative humidity varying from 80% to 40% during the day. The dryer fan has a maximum speed of 6,600 cubic feet of air per minute.

The grain is discharged from the dryer into a bin at 19% moisture content and 110° F. In the bin a flow of ambient air is circulated through the grain by a variable speed fan that is controlled by a VFD (variable flow device that can vary the speed of the fan) at a comparatively low flow rate of 0.33 cubic feet per minute per bushel for approximately 7 hours until the grain is at 17% moisture content and cooled to ambient temperature of 76° F. The grain is held in the bin after cooling at 2% over market moisture content until Spring. At a time when ambient humidity and temperature are such to provide additional drying, ambient air is again circulated through the grain with heating to increase the temperature of the air about 10° F. so as to be utilized in an equilibrium moisture process until the grain reaches a market target moisture content of 15% moisture content. As the process utilizes an average of 1600 BTUs (British Thermal Units) per pound of water removed and there is about 3.5 pounds of water per bushel in the harvest grain to be removed, the process consumes about 80 million BTUs for the first 5% decrease in moisture content and about 1200 BTUs per pound for the last 1.58 pounds of water per bushel, so that the energy consumed is about 28.4 million BTUs for a total of 112.4 million BTUs for the for the entire process which is a significant savings in energy use compared to using a full heat process to remove all of the moisture down to 15% moisture content. In addition, the present process is less likely to cause kernel cracking of the grain or other damage to the grain.

The process of this application utilizes substantially less heat per bushel to dry to market moisture content as compared to processes using full heat or modified full heat drying and does so with less degradation of the final product.

The circulating fan of the present embodiment has a variable range of operation and can operate at low flow rates, such as 0.33 cubic feet per minute per bushel of grain. This allows the fan to be operated at a low or reduced air flow rate as compared to the conventional fans that always operate at a high flow rate and have only on or off settings, as compared to the variable range of operation of the fan of the present application. The reduced flow rate also can be utilized to remove a maximum amount of moisture without over cooling the grain prior to the moisture being able to permeate the shell of the grain being dried. In particular, cooling is optimized by monitoring and controlling the headspace temperature above the grain and relative humidity by varying the speed of the variable speed fan. This allows the moisture in the kernel to pass through the shell and arrive on the surface to be removed by air flow without overcooling prior to the moisture escaping from the kernels which would remove the energy from the grain that drives the moisture out.

In the process, the measurement of the humidity of the grain in the top or headspace of the bin above the grain is utilized to maximize the moisture removal by coordinating with and controlling the fan speed to reduce the speed, if humidity drops in the air exiting the bin and to increase speed if humidity raises.

Overall, the bin headspace temperature is compared to the incoming ambient air temperature so as to decrease air flow and cooling, when the temperature become equivalent, whereat cooling is considered complete, the cooling portion of the process is stopped with the grain being about 2% above market moisture content.

The headspace and ambient air temperature are also utilized in the equilibrium maintenance portion of the drying procedure and can be utilized to automatically start and stop the bin fan operation.

It is noted that some maintenance of the grain is required while in the bin including circulating air at various times to prevent mold and the conversion of the grain into an unusable wet mass due to moisture being allowed to be present on the exterior of the kernel without being removed by circulating air.

It is to be understood that while certain forms of the present invention have been illustrated and described herein, it is not to be limited to the specific forms or arrangement of parts described and shown.

What is claimed and desired to be secured by Letters Patent is as follows:

1. A method of reducing the moisture contained in grain including the steps of:

a) setting a final target moisture content for a quantity of grain to be dried;

b) placing the grain to be dried into a dryer;

c) passing heated air through the grain in the dryer and heating the grain with heated air flow until a preselected intermediate moisture is obtained in the grain and the grain has achieved a preselected intermediate temperature wherein the preselected intermediate temperature and preselected intermediate moisture content are determined based upon the amount of moisture still needed to be removed from the grain to achieve the selected final moisture content based on the energy remaining in kernels of the grain;

d) transferring the grain at the preselected intermediate temperature to a cooling bin;

e) blowing air through the grain while monitoring the temperature and humidity of the air exiting the grain;

f) during the step of blowing air through the grain controlling the flow rate of the air through the grain by adjusting the speed of a fan mechanism that produces the flow of air such that as the humidity of the air exiting the grain decreases, the fan mechanism decreases the flow of air as long as the air temperature of the air exiting the grain in the cooling bin is above ambient air temperature and increasing the air flow rate from the fan mechanism when the humidity approaches 100% in the air exiting the grain that is cooling in the cooling bin to thereby maximize moisture removal from the grain relative to the heat remaining in the grain.

2. The method according to claim 1 wherein the fan mechanism includes at least one variable speed fan and controlling the fan mechanism to produce an air flow through the grain of 0.5 or less cubic feet per minute.

3. The method according to claim 1 wherein the fan mechanism comprises a plurality of independent fans wherein each fan includes an on/off control to allow for the fans to be controlled in such a way as to produce different air flow rates in response to the humidity of the air exiting the grain in the cooling bin.

4. The method according to claim 1 including:

a) providing inlet air humidity and temperature sensors; and b) providing a controller that receives output from the humidity and temperature sensors for the air when the air enters and exits the grain in the cooling bin and thereafter controls the air flow by adjusting the fan mechanism to increase or decrease the air flow.

5. A method of reducing the moisture contained in grain including the steps of:

a) setting a final target moisture content for a quantity of grain to be dried;

b) placing the grain to be dried into a dryer;

c) passing heated air through the grain in the dryer and heating the grain with heated air flow until a preselected intermediate moisture is obtained in the grain and the grain has achieved a preselected intermediate temperature wherein the preselected intermediate temperature and preselected intermediate moisture content are determined based upon the amount of moisture still needed to be removed from the grain to achieve the selected final moisture content based on the energy remaining in kernels of the grain;

d) transferring the grain at the preselected intermediate temperature to a cooling bin;

e) blowing air through the grain while monitoring the temperature and humidity of the air exiting the grain;

f) during the step of blowing air through the grain controlling the flow rate of the air through the grain by adjusting the speed of a fan mechanism that produces the flow of air by including selecting a target high humidity and wherein the controller increases air flow when humidity in air exiting the cooling bin is below the target high humidity and the temperature of the air is above ambient air temperature and decreasing the air flow rate when the humidity of the grain exiting the grain in the cooling bin is below the target high humidity.

6. A method of cooling heated grain and reducing the moisture level of grain after the grain exits a full heat dryer at a temperature above ambient temperature and at a grain moisture content above a desired market grain moisture content, comprising the steps of:

a) providing a cooling bin for receiving the heated grain;

b) placing the heated grain in the cooling bin;

c) providing a pathway for ambient air to enter the cooling bin pass through the heated grain and then exit the cooling bin;

d) locating a humidity sensor and a temperature sensor in the pathway whereat the air that has passed through the heated grain exit the cooling bin;

e) providing at least one variable air flow output fan system that draws ambient air and circulates the air through the pathway while simultaneously providing at least one fixed air flow output fan that draws ambient air and circulates the air through the pathway; and f) connecting the humidity and temperature sensors through a control system with the fan systems and utilizing the output of the temperature and humidity sensors to control the air flow output of the fan system by:

1) increasing the air flow through the bin when the humidity sensor indicator indicates that the moisture level in the airflow is close to or at 100%;

2) decreasing the air flow through the bin when the humidity sensor indicator that the moisture level in the air is substantially below 100%; and 3) turning off the fan system completely to stop air flow if the temperature of the air when the humidity sensor is less than 100% and the temperature sensor indicates that the temperature in the existing air flow is ambient temperature.

7. The method according to claim 6 including the steps of:

a) providing an ambient temperature sensor;

b) providing an ambient humidity sensor;

c) connecting the ambient temperature and humidity sensors to the control system and utilizing the output of the ambient temperature sensor and output temperature sensors for operative control of the fan system.

8. The method according to claim 6 wherein:

a) the fan system includes at least one of the fixed speed fans can be turned on or off to control total air flow output through that respective fan.

9. The method according to claim 6 wherein:

a) said fan system includes at least two fixed speed fans that can individually be turned on and off to control total air flow output therefrom.

10. A grain drying system comprising:

a) providing a grain dryer adapted to receive and discharge grain therefrom;

the dryer having an interior;

b) providing a first conduit between atmospheric air and the dryer interior;

c) providing a fixed speed on/off first fan positioned to draw air through the first conduit and into grain in the interior of the dryer;

d) providing a conveyor operably to convey grain from the dryer to a bin; the bin having an interior;

e) providing a second conduit communicating with the interior of the bin; and f) providing a variable speed second fan positioned in the second conduit to draw ambient air from the atmosphere and discharge air into the interior of the bin and cooling the grain from the dryer utilizing the second fan at a low speed.

11. The drying system according to claim 10 including:

a) providing a heater positioned to heat air in the second conduit.

12. A method of drying field harvested grain comprising the steps of:

a) providing a grain dryer adapted to receive and discharge grain therefrom; the dryer having an interior;

b) providing a first conduit between atmospheric air and the dryer interior;

c) providing a fixed speed on/off first fan positioned to draw air through the first conduit and into grain in the interior of the dryer;

d) providing a conveyor operably to convey grain from the dryer to a bin; the bin having an interior;

e) providing a second conduit communicating with the interior of the bin; and f) providing a variable speed second fan positioned in the second conduit to draw ambient air from the atmosphere and discharge air into the interior of the bin and cooling the grain from the dryer utilizing the second fan at a low speed;

g) selecting a target market moisture content for market grain;

h) transferring the field harvested grain having a moisture content more than four percent above the market moisture content to the dryer;

i) inputting heated air into the dryer by operating the first fan and heater at full output thereof until the grain is about four percent moisture content above the target moisture content;

j) after step i transferring the grain to the bin;

k) after step j cooling the grain in the bin by passing ambient air through the grain using the second fan operated at a level below about 0.5 cubic feet per minute per bushel of grain in the bin until the grain is at about two percent moisture content above the market moisture content;

l) after step k storing the grain over a cold season until the ambient temperature and humidity becomes sufficient to remove moisture from the grain by passing ambient air through the grain; and m) after step l operating the second fan in an equilibrium moisture process mode to reduce the moisture content of the grain to market moisture content and thereafter maintain at the market moisture content.

13. The method according to claim 12 wherein the second fan is operated at between 0.1 and 0.33 cubic feet per minute per bushel of grain in the bin.

14. A method of drying grain that has a harvest moisture content and a market moisture content including the steps of:

a) placing the grain in a dryer and applying full heat to the grain until the grain is within about four percent moisture above target market moisture content and has a temperature in the range of about 90° to 150° F.;

b) after step of transferring the grain from the dryer to a bin;

c) circulating cooling ambient air at a low velocity through the grain in the bin to reduce the temperature of the grain to ambient air temperature while removing moisture so that the moisture content is thereafter about two percent above the target market moisture content;

d) subsequent to cooling the grain to ambient air temperature holding the grain in the bin until a later date when ambient temperature and humidity are sufficient to remove additional moisture whereat ambient air is passed through the grain to remove moisture to the target market moisture content by an equilibrium moisture process; and wherein e) a heater is used to raise the temperature of the ambient air to increase the speed of the drying in step by at least 5° F.; and f) the heater has a first controller and the fan circulating ambient air has a second controller with the first and second controllers operating independently of each other.

15. The method according to claim 14 wherein:

a) the harvest moisture content is above 20% moisture;

b) the target market moisture content is 15% moisture;

c) the grain is removed from the dryer at about 19% moisture content; and d) after cooling in the bin to ambient temperature the grain is at a first intermediate moisture content of about 17% moisture content.

16. A method of drying harvested grain with a harvest moisture content comprising the steps of:

a) selecting a market moisture content for the grain;

b) placing the grain in a dryer and circulating air heated by a full heat heater through the grain until a first intermediate grain moisture content that is above the market moisture content occurs;

c) after step b removing the grain from the dryer and placing the grain in a bin at a temperature above ambient air temperature;

d) after the grain is placed in the bin circulating ambient air at a comparatively low flow rate through the grain until the grain is cooled to ambient air temperature and the grain has a second intermediate moisture content that is above market moisture content;

e) after step d holding the grain in the bin until ambient air temperature and humidity levels are such as to be able to remove additional moisture from the grain if placed in contact with the grain and at that time circulating ambient air at the low flow rate through the grain until the grain moisture content is at market moisture content; and f) thereafter holding the grain in the bin until transferring to market.

17. The process according to claim 16 wherein:

a) the first intermediate grain moisture content is about 4% above market moisture content; and b) the second intermediate grain moisture content is about 2% above market moisture content.

18. The process according to claim 17 wherein:

a) the grain is selected from corn, wheat, rice, and soybeans.

19. The process according to claim 18 wherein:

a) the temperature of the grain after entering the bin is about 110° F.

20. The process according to claim 19 wherein:

a) the fan is a variable speed fan and the low circulation flow rate circulates air through the grain at or below 0.5 cubic feet per minute per bushel of grain.

21. The process according to claim 19 wherein:

a) the fan circulates the air in a range from about 0.1 to 0.33 cubic feet per minute per bushel of grain.

* * * * *